United States Patent [19]

Klopfer

[11] Patent Number: 4,565,858

[45] Date of Patent: Jan. 21, 1986

[54] POLYETHERIMIDES WITH HIGH THERMAL STABILITY AND SOLVENT RESISTANCE AND PRECURSORS THEREFOR

[75] Inventor: Howard J. Klopfer, Clifton Park, N.Y.

[73] Assignee: General Electric Company, Schenectady, N.Y.

[21] Appl. No.: 665,262

[22] Filed: Oct. 26, 1984

[51] Int. Cl.[4] .............................................. C08G 73/10
[52] U.S. Cl. ..................................... 528/172; 528/185
[58] Field of Search ............... 528/125, 126, 128, 172, 528/185

[56] References Cited

U.S. PATENT DOCUMENTS

| | | | |
|---|---|---|---|
| 3,847,867 | 11/1974 | Heath et al. | 528/185 |
| 3,983,093 | 9/1976 | Williams, III et al. | 528/185 |
| 4,417,044 | 11/1983 | Parekh | 528/185 |
| 4,429,102 | 1/1984 | Evans et al. | 528/185 |

*Primary Examiner*—Lester L. Lee
*Attorney, Agent, or Firm*—William H. Pittman; James C. Davis, Jr; James Magee, Jr.

[57] ABSTRACT

Polyetherimides and their polyamic acid precursors are derived from bisphenol A dianhydride, or a mixture thereof with pyromellitic dianhydride, and bis(4-aminophenyl) sulfone or a mixture thereof with m-phenylenediamine and/or p-phenylenediamine. The polyetherimides are characterized by high thermal stability and solvent resistance.

11 Claims, 7 Drawing Figures

(I) 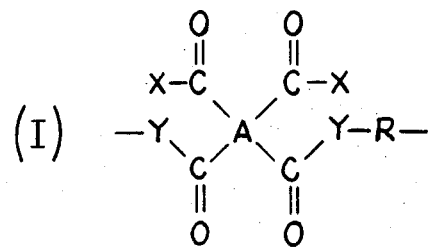
(II) 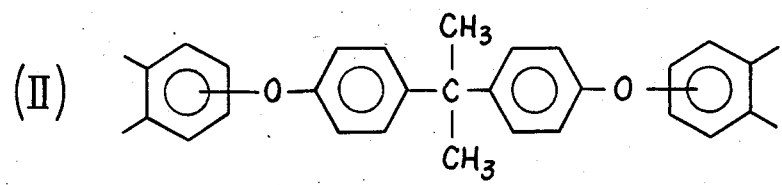
(III) 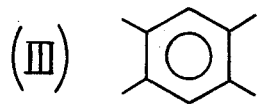
(IV) 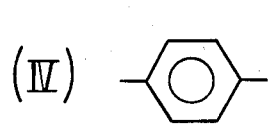   (V) 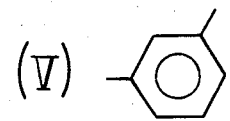
(VI) 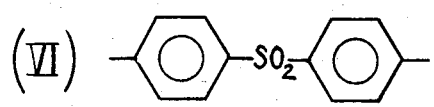
(VII) 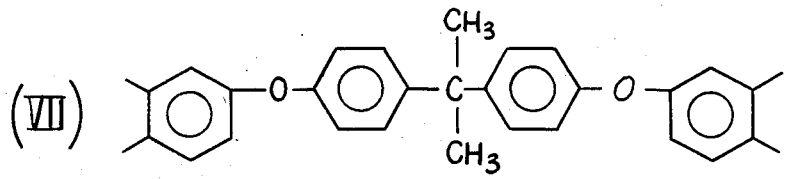

POLYETHERIMIDES WITH HIGH THERMAL STABILITY AND SOLVENT RESISTANCE AND PRECURSORS THEREFOR

This invention relates to new polymeric compositions of matter, and in particular to new polyetherimides and polyamic acid precursors therefor characterized by high thermal stability and solvent resistance and good processability.

Polyetherimides are a known class of polymers useful as industrial resins. They are generally useful as injection moldable thermoplastics having excellent flame retardant properties. Examples of polyetherimides useful for these purposes are the condensation products of m-phenylenediamine and 2,2-bis[4-(3,4-dicarboxyphenoxy)phenyl]propane dianhydride (hereinafter "bisphenol A dianhydride").

A need exists for polymers having the advantages of polyetherimides but having improved thermal stability as exemplified by a higher glass transition temperature, as well as improved solvent resistance. One step in that direction is represented by U.S. Pat. No. 3,983,093, which discloses polymers of this type prepared from a mixture of bisphenol A dianhydride or a similar compound with pyromelitic dianhydride, benzophenone dianhydride or a bis-dicarboxyphenyl sulfide dianhydride. It is frequently found, however, that processing of such mixed polymers under conditions used for ordinary polyetherimides is difficult.

A principal object of the present invention, therefore, is to provide novel polyetherimides and polyamic acid precursors therefor.

A further object is to provide polyetherimides combining high thermal stability and solvent resistance with good processability.

Other objects will in part be obvious and will in part appear hereinafter.

In its broadest sense, the present invention is directed to polymers consisting essentially of structural units having formula I in the drawings, wherein:

in each instance, X is OH and Y is NH, or X and Y taken together are N;

each A has formula II or III, at least about 50% of the A moieties in said polymer having formula II; and each R has formula IV, V or VI, at least about 5% of the R moieties in said polymer having formula VI.

As is apparent from the foregoing description, the polymers of this invention are polyamic acids and polyetherimides of the type which may be prepared by reacting bisphenol A dianhydride or an isomer thereof, or a mixture thereof with pyromellitic dianhydride, with bis(4-aminophenyl)sulfone or a mixture thereof with at least one of m-phenylenediamine and p-phenylenediamine. Because bis-phenol A dianhydride, in which A has formula VII, is the most readily available dianhydride of this type, reference will be made hereinafter to it and the polyetherimides derived from it. However, it should be understood that either of its two carboxy group position isomers (i.e., the bis-3,3-dicarboxy and mixed 2,3- and 3,4-carboxy compounds) may be substituted therefor when appropriate.

The anhydride-derived moieties in the polymers of this invention may all be bisphenol A dianhydride-derived moieties, or up to about 50% of the total number thereof may be derived from pyromellitic dianhydride. The preferred polymers are those in which at least about 95%, and most preferably all, of said moieties are derived from bisphenol A dianhydride.

Of the diamine moieties, at least about 5% of the total number thereof are derived from bis(4-aminophenyl)sulfone. The remainder, if any, are derived from m-phenylenediamine, p-phenylenediamine or a mixture thereof. If all diamine moieties are derived from bis(4-aminophenyl)sulfone and p-phenylenediamine (i.e., have formulas IV and VI), it is preferred that at least about 50% and most preferably at least about 55% of the total number thereof be derived from p-phenylenediamine (i.e., have formula IV). Most often, however, all the diamine moieties are derived from bis(4-aminophenyl)sulfone or a mixture thereof with m-phenylenediamine (i.e., have formulas V and VI). When both formulas are present, about 5–95% of the total number thereof have formula VI.

The polymers of this invention may contain polyetherimide linkages, wherein X and Y together form N; polyamic acid linkages, wherein X is OH and Y is NH; or a mixture thereof. As noted hereinafter, the polyamic acids are generally obtained as intermediates in polyetherimide preparation. The polyetherimides, in which substantially all X-Y combinations are N, are preferred as the final products.

The polyetherimides of this invention may be prepared by reacting bis(4-aminophenyl)sulfone, or a mixture thereof with m-phenylenediamine and/or p-phenylenediamine, with bisphenol A dianhydride or a mixture of bisphenol A dianhydride and pyromellitic dianhydride. Various other reagents such as the free carboxylic acids, acyl halides, esters, amides and imides may be substituted for the anhydrides, but the anhydrides are preferred.

In the reaction, about 0.95–1.04 moles of diamine is usually employed per mole of dianhydride. The reaction may be by melt polymerization, but more often takes place in an aprotic solvent which may be an aromatic solvent such as chlorobenzene, o-dichlorobenzene or a mixture of m-cresol and toluene, or an aliphatic polar solvent such as dimethylformamide, dimethylacetamide, dimethyl sulfoxide or N-methylpyrrolidone.

Alternatively, the reaction may be carried out in two stages in which the first stage is the formation of a polyamic acid and the second stage is the imidization of said polyamic acid. The first stage is typically carried out at a temperature within the range of about 25°–100° C. in an aliphatic solvent such as those enumerated above. In the second stage, the polyamic acid is converted to the polyetherimide, typically by heating in the range of about 180°–375° C. Imidization is normally carried out of the absence of solvents, although aromatic solvents such as those enumerated above may be used if desired.

It is within the scope of the invention to include in the reaction mixture chain stopping agents, typically monofunctional aromatic amines such as aniline or monoanhydrides such as phthalic anhydride. They are typically present in the amount of about 1–5 mole percent of total anhydride or amine constituents, as appropriate. Oxygenated phosphorus compounds may also be present as catalysts in accordance with U.S. Pat. No. 4,324,882, the disclosure of which is incorporated by reference herein.

The polyetherimides of this invention may also be prepared by the reaction of a diamine with a bisimide of an amine containing an electron-deficient radical, as disclosed in copending, commonly assigned application Ser. No. 505,636, filed June 20, 1983, the disclosure of which is incorporated by reference herein.

The weight average molecular weights of the polymers of this invention are generally within the range of about 5,000–100,000 and most often about 10,000–50,000. Their intrinsic viscosities, measured in chloroform at 25° C., are usually at least about 0.4.

An important property of the polyetherimides of this invention is their high glass transition temperatures, generally at least 225° C. The glass transition temperatures given herein are midpoint figures, representing the inflection point of the temperature-calories per second glass transition temperature curve.

The preparation of the compositions of this invention is illustrated by the following examples. All intrinsic viscosity figures are in chloroform at 25° C.

EXAMPLES 1–6

A Helicone vertical mixer was flushed with nitrogen and charged with a mixture of bisphenol A dianhydride, bis(4-aminophenyl)sulfone or a mixture thereof with m-phenylenediamine, and phthalic anhydride (except in Example 6). In Examples 1–3, the amount of phthalic anhydride was 3.5 mole percent, and in Examples 4–5 3.1 mole percent, of total anhydride. (No phthalic anhydride was used in Example 6.) The mixture was heated to 290° C., with stirring. Water evolution was observed beginning at 110° C. The total heating time at 290° C. was 60 minutes. The product was removed from the mixer and ground to a powder.

The properties of the products of Examples 1–6, together with the mole percentages of bis(4-aminophenyl)sulfone (identified as "sulfone") in the amine constituents used for the preparation thereof, are given in Table I. By contrast, the corresponding Tg figure for a polyetherimide prepared from bisphenol A dianhydride and m-phenylenediamine alone, and having an intrinsic viscosity of 0.60 dl./g., was 223° C.

TABLE I

| Example | Sulfone units | Mole ratio anhydride:diamine | Tg, °C. | Int. vis, dl./g |
|---|---|---|---|---|
| 1 | 10 | 0.944 | 230 | 0.68 |
| 2 | 15 | 0.944 | 231 | 0.77 |
| 3 | 20 | 0.944 | 236 | 0.78 |
| 4 | 25 | 0.955 | 236 | 0.63 |
| 5 | 50 | 0.955 | 240 | 0.61 |
| 6 | 100 | 1.000 | 251 | 0.53 |

EXAMPLES 7–9

Substantially equimolar amounts of dianhydrides and diamines were dissolved in o-dichlorobenzene to form a solution containing 30% solids by weight. Sodium diphenyl phosphate was added in the amount of 0.02% by weight of reactants. The mixture was flushed with nitrogen and heated for 48 hours at 180° C., with stirring, as water was removed by azeotropic distillation. The solution was then cooled and diluted with chloroform, and the resulting solution was poured into methanol with vigorous agitation to precipitate the polyetherimide. The product was redissolved in chloroform and precipitated by addition to methanol, and vacuum dried.

The proportions of reagents used, and the properties of the polymers obtained, are given in Table II.

TABLE II

| | Example | | |
|---|---|---|---|
| | 7 | 8 | 9 |
| Bisphenol A dianhydride, mole % | 100 | 95 | 97 |
| Pyromellitic dianhydride, mole % | — | 5 | 3 |
| Bis(4-aminophenyl) sulfone, mole % | 45 | 90 | 100 |
| m-Phenylenediamine, mole % | — | 10 | — |
| p-Phenylenediamine, mole % | 55 | — | — |
| Tg, °C. | 243.2 | 256.7 | 263.3 |
| Intrinsic viscosity, dl./g. | 0.50 | 0.41 | 0.61 |

EXAMPLES 10–14

Following the procedure of Examples 1–6, bisphenol A dianhydride or a mixture thereof with pyromellitic dianhydride (identified as "PMDA") was reacted with bis(4-aminophenyl)sulfone. In Example 10, equimolar amounts of dianhydride and diamine were employed; in Examples 11–14, phthalic anhydride was present in the amount of 3.0 mole percent of total anhydride and the mole ratio of total anhydride to diamine was 1.008. The relevant parameters and properties are given in Table III.

TABLE III

| Example | PMDA units | Tg, °C. | Int. vis., dl./g. |
|---|---|---|---|
| 10 | 0 | 251 | 0.72 |
| 11 | 10 | 263 | — |
| 12 | 15 | 265 | 0.58 |
| 13 | 20 | 271 | 0.70 |
| 14 | 25 | 275 | 0.67 |

As will be apparent from the Tg values in Tables I–III, the polymers of this invention are characterized by high thermal stability. They are also highly resistant to solvent action.

The polyetherimides of this invention may be used for the formation of films, molding compounds, coatings and the like. Their use is of particular advantage where high thermal stability and solvent resistance are desired. Typical areas of utility are in automobile and aviation applications for decorative and protective purposes, as high temperature electrical insulators and dielectrics for capacitors, as coil and cable wrappings, for containers and container linings, in laminating structures for application as films to various heat-resistant or other types of materials, and as filled compositions wherein the fillers may be asbestos, mica, glass fiber or the like. Other uses include as binders for asbestos fibers, carbon fibers and other fibrous materials in making braking linings, and for formulation of molding compositions using fillers such as asbestos, glass fibers, talc, quartz, wood flour, finely divided carbon and silica. Other uses are similar to those described in the aforementioned U.S. Pat. No. 3,983,093, which is incorporated by reference herein.

What is claimed is:
1. A polymer consisting essentially of structural units having formula I in the drawings, wherein:
in each instance, X is OH and Y is NH, or X and Y taken together are N;
each A has formula II or III, at least about 50% of the A moieties in said polymer having formula II; and
each R has formula IV, V or VI, at least about 5% of the R moieties in said polymer having formula VI.

2. A polymer according to claim 1 which is a polyetherimide wherein substantially all X and Y values taken together are N.

3. A polymer according to claim 2 which has a midpoint glass transition temperature of at least 225° C.

4. A polymer according to claim 3 wherein at least about 95% of the A values have formula VII.

5. A polymer according to claim 4 wherein all the R values have formula VI.

6. A polymer according to claim 4 wherein at least about 55% of the R values have formula IV and the remainder have formula VI.

7. A polymer according to claim 4 wherein about 5-95% of the R values have formula VI and the balance have formula V.

8. A polymer according to claim 3 wherein all the A values have formula VII.

9. A polymer according to claim 8 wherein all the R values have formula VI.

10. A polymer according to claim 8 wherein at least about 55% of the R values have formula IV and the remainder have formula VI.

11. A polymer according to claim 8 wherein about 5-95% of the R values have formula VI and the balance have formula V.

* * * * *